Patented Feb. 19, 1924.

1,484,038

UNITED STATES PATENT OFFICE.

JOHN REICHEL, OF PHILADELPHIA, AND FRANK M. HUNTOON, OF SWARTHMORE, PENNSYLVANIA, ASSIGNORS TO H. K. MULFORD COMPANY, OF PHILADELPHIA, PENNSYLVANIA, A CORPORATION OF PENNSYLVANIA.

PRODUCT AND PROCESS FOR THE RECOVERY OF BACTERIAL ANTIBODIES.

No Drawing. Application filed February 1, 1923. Serial No. 616,373.

*To all whom it may concern:*

Be it known that we, JOHN REICHEL, a citizen of the United States, residing in Philadelphia, county of Philadelphia, State of Pennsylvania, and FRANK M. HUNTOON, a citizen of the United States, residing in Swarthmore, in the county of Delaware and State of Pennsylvania, have invented a new and useful Improvement in Products and Processes for the Recovery of Bacterial Antibodies, of which the following is a specification.

This invention relates to a new and useful product consisting of bacterial antibodies, and a process involving mixing together antibacterial serums and a mass of dead or living bacteria, separating the antibody bacteria combination in the mixture from the mixture, and recovering from the combination the bacterial antibodies as a new product.

The term antibacterial serum as here employed is a serum obtained from a serum-producing animal that has been immunized or hyperimmunized with bacteria or substances derived from bacteria, as for example in the case of antipneumococcic serum Type I with a horse as the serum producing animal, the horse being injected repeatedly with pneumococci Type I will develop in the serum of the horse antibodies against pneumococci Type I. These antibodies have a prophylactic and therapeutic value in the control of Type I infections, for experimental animals and human beings.

In practice, horses are injected at regular intervals with emulsions of Types I, II and III pneumococci. The serum, after a number of injections, develops protective and other antibodies. To this serum is added an equal volume of a heavy emulsion of living pneumococci Types I, II and III. The mixture is placed at 37° C. for one hour, or 20° C. for twelve hours, and then centrifuged. The sediment is washed with salt solution to rid it of horse serum. The washed sediment is emulsified in salt solution containing 0.25 per cent sodium bicarbonate and heated to 55° C. for from thirty minutes to one hour. This causes disassociation of the pneumococcus (antigen) and antibody, the active antibody splitting off from the bacteria. The mixture is then centrifuged and thereby the supernatant fluid is removed, and chilled, re-centrifuged and finally filtered through a filter candle. The addition of the alkali 0.25 per cent sodium bicarbonate facilitates filtration. The final solution of bacterial antibodies is practically free of serum proteins, and contains only very small amounts of nitrogen per cubic centimeter. The final solution of bacterial antibodies shows on test the presence of antibodies against Types I, II and III pneumococci. These antibodies or active substances contained in the solution have prophylactic and curative value similar to the immune serum from which they were produced.

In the case of antibody solution of Types I, II and III pneumococci, the antibodies obtained being suspended in distilled water or salt solution, are practically free of the inert serum substance.

It is understood that the process is not to be limited to the use of the particular serum mentioned in the example since it has been mentioned only by way of an example, and as one of the serums for carrying out the new process and obtaining the new product, and furthermore that the process is not necessarily to be limited to the process as described, since it is only one mode and it is plain that the process is susceptible to modification in various particulars by persons skilled in the art without departing from the spirit or scope of the process disclosed.

What we claim is:

1. As an article of manufacture, a substance consisting of bacterial antibodies practically free of serum proteins, obtained from antibacterial serums.

2. As a new substance a solution of bacterial antibodies practically free of serum proteins, obtained from antibacterial serums.

3. As an article of manufacture, a substance consisting of the active principles of antibacterial serums, practically free of serum proteins, having prophylactic and therapeutic value.

4. As a new article of production, a substance consisting of bacterial antibodies isolated from antibacterial serums and practically free from serum proteins.

5. As a new article of production, a substance possessed of the active or immunizing principles of an immune serum and practically free of serum proteins and having prophylactic and therapeutic value similar to an immune serum.

6. As a new article of manufacture, a substance having antibody, prophylactic and curative characteristics similar to an immune serum, consisting of a solution of bacterial antibodies practically free from serum proteins.

7. As a new substance, specific bacterial antibodies, practically free from serum proteins, obtained from specific, monovalent or polyvalent antibacterial serums.

8. As a new substance, bacterial antibodies, practically free of proteins, obtained from sensitized bacteria.

9. A new substance consisting of a mixture of antibodies and bacteria with an alkali in solution.

10. The herein described process of isolating or separating bacterial antibodies practically free from serum proteins from antibacterial serums, comprising the steps of mixing together an antibacterial serum and a specific bacteria, separating from the mixture of sensitized bacteria, and recovering from the sensitized bacteria the bacterial antibodies.

11. In the process of recovering the bacterial antibodies from sensitized bacteria, the step of adding solutions of alkali to the sensitized bacteria to facilitate filtration.

In testimony whereof, we have signed our names to this specification.

JOHN REICHEL.
FRANK M. HUNTOON.